US010233838B2

(12) United States Patent
Vick

(10) Patent No.: US 10,233,838 B2
(45) Date of Patent: Mar. 19, 2019

(54) RECUPERATED GAS TURBINE ENGINE

(71) Applicant: Michael J. Vick, Vienna, VA (US)

(72) Inventor: Michael J. Vick, Vienna, VA (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 653 days.

(21) Appl. No.: 14/849,556

(22) Filed: Sep. 9, 2015

(65) Prior Publication Data
US 2016/0195017 A1 Jul. 7, 2016

Related U.S. Application Data

(60) Provisional application No. 62/047,855, filed on Sep. 9, 2014.

(51) Int. Cl.
*F02C 7/10* (2006.01)
*F02C 7/08* (2006.01)
(Continued)

(52) U.S. Cl.
CPC .............. *F02C 7/10* (2013.01); *F01D 5/284* (2013.01); *F02C 1/10* (2013.01); *F02C 3/14* (2013.01);
(Continued)

(58) Field of Classification Search
CPC .... F02C 7/08; F02C 7/10; F02C 3/103; F02C 3/05; F02C 3/08; F02C 3/085; F02C 3/09
(Continued)

(56) References Cited

U.S. PATENT DOCUMENTS 2,306,953 A * 12/1942 Jung ................... F01K 23/16
416/28
3,831,374 A    8/1974 Nicita
(Continued)

OTHER PUBLICATIONS

Vick, M.J., "High Efficiency Recuperated Ceramic Gas Turbine Engines for Small Unmanned Air Vehicle Propulsion," Ph.D. thesis, Mechanical Engineering Department, Imperial College London, Jan. 31, 2012.
(Continued)

*Primary Examiner* — Phutthiwat Wongwian
*Assistant Examiner* — Loren Edwards
(74) *Attorney, Agent, or Firm* — US Naval Research Laboratory; Richard F. Bis

(57) ABSTRACT

A gas turbine engine that includes a compressor, a turbine, a heat exchanger, and a combustor. The compressor is mounted on a rotating shaft with at least one rotor with an inlet and an outlet, and at least one diffuser downstream from each rotor. The turbine includes at least one stator, and at least one rotor with an inlet and outlet located downstream of each stator, and mounted on the rotating shaft as the at least one of the compressor rotors. The inlet of the compressor rotor faces toward the outlet of the turbine rotor. The heat exchanger is configured to preheat the compressed air leaving the compressor by transferring heat from the turbine exhaust. The combustor can be configured for mixing fuel with the compressed air, either upstream or downstream from the heat exchanger, and further configured for igniting the preheated fuel/air mixture located downstream from the heat exchanger.

17 Claims, 9 Drawing Sheets

(51) Int. Cl.
F02C 7/22 (2006.01)
F01D 5/28 (2006.01)
F02C 1/10 (2006.01)
F02C 3/14 (2006.01)
F02C 7/052 (2006.01)

(52) U.S. Cl.
CPC ............ F02C 7/052 (2013.01); F02C 7/08 (2013.01); F02C 7/22 (2013.01); F05D 2220/32 (2013.01); F05D 2220/764 (2013.01); F05D 2220/766 (2013.01); F05D 2250/80 (2013.01); F05D 2260/14 (2013.01); Y02E 20/14 (2013.01); Y02T 50/672 (2013.01); Y02T 50/673 (2013.01)

(58) Field of Classification Search
USPC ........................................... 60/39.511
See application file for complete search history.

(56) References Cited

U.S. PATENT DOCUMENTS

| | | | |
|---|---|---|---|
| 5,855,112 | A | 1/1999 | Bannai et al. |
| 6,634,176 | B2 | 10/2003 | Rouse et al. |
| 6,711,889 | B2 | 3/2004 | Kuo et al. |
| 7,775,031 | B2 | 8/2010 | Wood |
| 8,573,291 | B2 | 11/2013 | Vick |
| 8,840,359 | B2 | 9/2014 | Vick et al. |
| 2010/0293946 | A1* | 11/2010 | Vick .................. F02C 3/08 60/643 |
| 2012/0017598 | A1 | 1/2012 | Kesseli et al. |
| 2013/0149100 | A1 | 6/2013 | Lawlor et al. |

OTHER PUBLICATIONS

Vick, M. J., Jadaan, O. M., Wereszczak, A. A., Choi, S. R., Heyes, A. L., and Pullen, K. R., Aug. 2012, "Engine Design Strategies to Maximize Ceramic Turbine Life and Reliability," Journal of Engineering for Gas Turbines and Power, 134(8). Also published as: Vick, M. J., Jadaan, O. M., Wereszczak, A. A., Choi, S. M., Heyes, A., and Pullen, K. R., "Design strategies to maximize ceramic turbine life and reliability," ASME Turbo Expo 2011, GT2011-46784, Vancouver, B.C., Canada.

Vick, M. J., Heyes, A., and Pullen, K., Sep. 2010, "Design overview of a three kilowatt recuperated ceramic turboshaft engine," Journal of Engineering for Gas Turbines and Power, 132(9), p. 092301. Also published as: Vick, M. J., Heyes, A., and Pullen, K. R., "Design overview of a three kilowatt recuperated ceramic turboprop engine," ASME Turbo Expo 2009, American Society of Mechanical Engineers, Orlando, FL.

Vick, M. J., "Low-cost ball/air/magnetic hybrid bearing system for extended-life micro gas turbine engines," STTR topic N10A-T037, U.S. Office of Naval Research, Washington, D.C., Feb. 2010, p. 52-52.

Kelly, M. M., Pan, M.-J., Vick, M. J., Rancourt, G., Heyes, A., and Atre, S., "Ceramic microchannel recuperator fabrication methods for small gas turbine engines," ASME Turbo Expo 2012, GT2012-68510, Jun. 11, 2012, Copenhagen, Denmark.

Monroe, M. A., Sep. 2003, "A Market and Engineering Study of a 3-Kilowatt Class Gas Turbine Generator," Aeronautics and Astronautics, Massachussetts Institute of Technology, Cambridge, MA.

Monroe, M. A., Epstein, A. H., Kumakura, H., and Isomura, K., "Component Integration and Loss Sources in 3-5 kW Gas Turbines," ASME Turbo Expo Jun. 2005, GT2005-68715, Reno, NV.

Visser, W. P. J., Shakariants, S. A., and Oostveen, M., "Development of a 3kW micro turbine for CHP applications," ASME Turbo Expo Jun. 2010, GT2010-22007, Glasgow, Scotland.

Visser, W. P. J., Shakariyants, S. A., Ayed, A. H., Kusterer, K., and de Later, M. T. L., Jun. 2012, "Performance Optimization of a 3KW Microturbine for CHP Applications," ASME Turbo Expo, Jun. 2012, American Society of Mechanical Engineers, Copenhagen, Denmark.

Shih, H. Y., Wang, D., and Kuo, C.-R., "Feasibility Study of an Innovative Micro Gas Turbine with a Swiss-Roll Recuperator," ASME Turbo Expo May 2006, GT2006-91120, Barcelona, Spain.

* cited by examiner

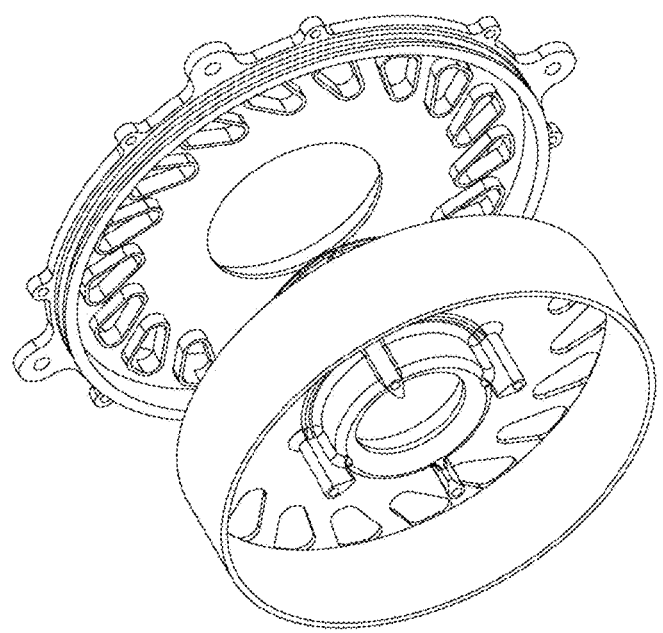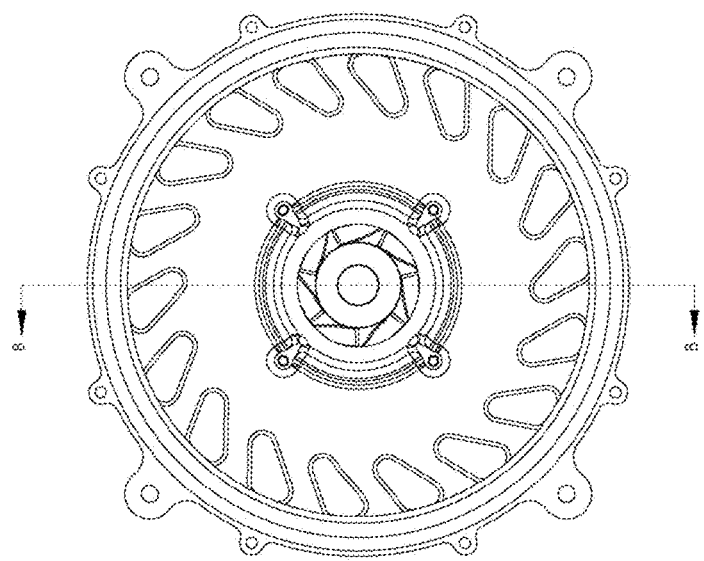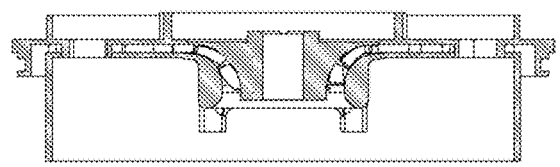
Figure 9

RECUPERATED GAS TURBINE ENGINE

CROSS-REFERENCE TO RELATED APPLICATIONS

This application claims priority to provisional patent application entitled, "Recuperated Gas Turbine Engine," filed on Sep. 9, 2014, and assigned U.S. Application No. 62/047,855; the entire contents of which are hereby incorporated by reference.

FIELD OF THE INVENTION

The present disclosure relates generally to gas turbine engines.

BACKGROUND

Historically, gas turbine engines have been able to achieve much better life and reliability than internal combustion (IC) engines, perhaps because they employ a steady flow combustion process, fewer moving parts, no reciprocating motion, and no surfaces in rubbing contact. Gas turbines are typically also adaptable to using a wider range of fuels. They generate almost no vibration and steady output torque, while IC engines more commonly generate peak:mean torque levels between 4:1 and 16:1. Turbines also produce only high-frequency noise, which is easier to mitigate and tends to naturally damp out quickly in the atmosphere, while low sound frequencies can travel long distances through the air, ground, or water. With all these advantages, gas turbines are often the preferred power plant in many applications, particularly aircraft propulsion and stationary power generation.

Small gas turbines are of interest for residential combined heat and power (CHP), unmanned air vehicle (UAV) propulsion, portable power generation, and other applications. However, they have difficulty competing with piston engines due to inferior fuel efficiencies. This may be due to scaling effects. For example, gas flows at small length scales are characterized by low Reynolds numbers, which means that inertial effects become less important than viscous effects, viscous friction wastes more power, and turbomachinery becomes less efficient. Small turbomachinery tip clearances and trailing edge thicknesses tend to be relatively larger, relative to blade chord and span, than in large engines, and this also leads to larger losses and lower compression and expansion efficiencies. Another scaling effect is heat transfer by conduction and convection, which tends to be more effective at small scale than at large scale. Unwanted heat transfers, particularly heat losses from the burner and heat transfer to the compressor, can reduce fuel efficiency severely in small turbines.

However, scaling effects that favor small engines can be exploited to improve their fuel efficiency. For example, the fact that convection heat transfer improves at small scale suggests that a "recuperator"—a heat exchanger that pre-heats combustion air using waste heat from the exhaust, saving fuel—could perform well in a small engine. Ceramic materials are more reliable at small scale, and since they can withstand higher temperatures than metals without cooling, they enable higher turbine inlet temperatures, which improve engine efficiency and specific work. Higher specific work means the engine uses less airflow to produce its target power output. This reduces recuperator size. Recuperators can be made from ceramic materials as well, which reduces weight and improves performance.

One early effort to implement the recuperation strategy was the IHI Dynajet, a commercial three kilowatt recuperated gas turbine designed for portable power generation. It was designed for 20% fuel efficiency, and its compressor, turbine, and recuperator performed well enough in separate rig tests to achieve this goal. However, when these components were assembled into a complete engine, it only reached 6% efficiency. It was shown that fluid leaks among the components and heat leakage from the hot section into the compressor flow path were the main reasons for the discrepancy, and that many of these flows could be greatly reduced through better thermal insulation and gas seals.

Additional efforts involved companies developing small turbine engines or "microturbines" for small-scale power generation in the 30-200 kW power range, with efficiencies well above 25%. These small turbine engines are typically manufactured and sold in large quantities for markets like combined heat and power for small to medium businesses, backup power for hospitals, and natural gas propulsion for commercial vehicles. Others have sought to build smaller engines to fit the CHP demands of a single residence. Since these engines are designed for land-based applications where weight does not matter as much as fuel efficiency, a relatively large and heavy recuperator could be used, and some complexity could be tolerated. These engines typically employ a conventional turbomachinery arrangement in which the compressor outlet and turbine inlet are adjacent to each other.

FIG. 1 is a prior art diagram of a conventional recuperated microturbine. The combustor is an annular design surrounding the turbine and its exhaust duct. Annular combustors are common in gas turbines but they are somewhat complex, requiring multiple fuel injectors to be spaced evenly around the ring, to spread out the heat of combustion evenly.

In some applications like aircraft propulsion, compactness and weight carry greater importance. Simplicity is even more critical in aircraft, partly because simpler engines tend to be smaller, lighter, and cheaper, but more importantly because simplicity directly leads to better reliability. One way to simplify the engine is to replace the annular combustor with a single "can" combustor and just one fuel injector.

One of the most successful turboshaft engines of all time, the Rolls Royce Allison 250 and its many derivatives, accomplished this by reversing the turbine gas flow direction, so that the turbine outlet faces the compressor. The inlet faces away from the rotating assembly, where a can combustor can be located; it need not be annular because there is no turbomachinery or exhaust duct occupying its centerline. This innovation simplifies the whole engine dramatically, while also making it much easier to inspect and repair. To make use of these advantages in recuperated engines, others designed gas turbine engines with reversed turbines and simple can combustors. FIG. 2 is a prior art diagram of a gas turbine engine with a reversed turbine. This configuration has been shown to be convenient and compact to locate the recuperator in the space surrounding the burner. The fuel injector, not shown in FIG. 2, can typically be positioned on the left side of the picture on the engine centerline.

The layout of the engine in the prior art FIG. 2 is compact and simple, and it can reduce heat losses from the combustor. A single can combustor typically has much less surface area than an annular combustor of the same volume. This is partly because it has only an outer surface ("liner"), rather than an outer and an inner liner; and because the outer diameter of the annular combustor must be larger, to provide the same volume in the same axial length. With much less surface area, heat transfer by convection and radiation to the surroundings will typically be less, and with smaller heat losses, less fuel is required to heat up the gas to the target combustor outlet temperature. Thus the can combustor, with its reduced surface area, will typically be more fuel-efficient.

Although advantageous in many respects, the FIG. 2 layout does suffer from certain drawbacks. One problem is the axial thrust on the bearings. Compressor and turbine rotors generate thrust due to imbalanced gas pressures. The back (flat) face of a compressor wheel is exposed to elevated gas pressure, roughly equal to that at the rotor outlet/diffuser (compressor stator) inlet, while gas pressures on the front (inlet) side of the rotor are lower. Thus, there is a net axial thrust toward the inlet. In turbine rotors, gas pressure is higher on the inlet side than it is on the outlet (exhaust) side. Therefore, in FIG. 2, both the turbine and the compressor generate an axial thrust on the rotating assembly that points from left to right. This means that their values add together rather than balancing each other out, leading to potentially very high net axial loads on the bearings. Since the life of a rolling element bearing is proportional to the load cubed, this can lead to short bearing life and premature bearing failure.

Along with high bearing thrust loads, another disadvantage of the FIG. 2 prior art layout is gas leakage. With the compressor back face (where gas pressure is high) located next to the turbine outlet (where gas pressure is low), the leakage rate of gas from compressor to turbine is likely to be very high. To minimize this, there would need to be a gas seal positioned somewhere along the rotating shaft between the turbine and compressor rotors. However, this shaft will be hot. It would be difficult to position a contact seal in that location because the contact seal would overheat. A non-contact labyrinth seal might make sense but due to the high gas pressure difference, the leakage rate would be quite substantial through this area, and this would substantially reduce the overall engine efficiency. Based on published studies on small gas turbine engines, it is very important to minimize leakage flows in all areas of the engine. In this engine layout there is no readily apparent way to minimize the gas leakage rate along the rotating shaft.

Another disadvantage of the engine layouts in both prior art FIG. 1 and FIG. 2 relates to heat transfer to the compressor diffuser. The diffuser is the radial channel from the compressor rotor outlet to the outer engine casing. In the diffuser, air enters at high tangential velocity and slows down as it progresses toward the diffuser outlet. During that process, its total pressure (static+dynamic) remains relatively constant, falling only slightly due to friction, but as the air slows down, the dynamic pressure decreases, while the static pressure—the useful part—rises. In fact, a substantial portion of the overall compressor pressure rise occurs in the diffuser, often approximately 40%. The warmer the air is while it is slowing down and converting dynamic pressure to static pressure, the less the static pressure will rise. To make up for this, the rotor has to impart more tangential velocity to the air, either by spinning faster or by being larger in diameter. Either way makes the compressor consume more shaft power and makes the engine, as a whole, less efficient. In other words, heat transfer to the compressor diffuser is bad because it requires more shaft power to compress the gas enough to reach the target outlet pressure. Another way of looking at this is to say that heat transfer to any part of the compressor will reduce its efficiency, relative to an adiabatic (i.e., unheated) compressor. The cooler any gas is during a compression process, the less energy that process takes. In any engine, the cooler the gas is during compression and the hotter it is during expansion, the more net power is generated per unit mass flow, and the higher the efficiency. On a shaft power basis, this effect can be substantial, as many others have shown.

Another problem in many prior art microturbines is the difficulty of keeping the bearings cool, especially the one closest to the turbine rotor. In very small engines, the distance between this bearing and the turbine rotor can be as short as 1-2 inches, and the temperature of the turbine rotor can be 900 degrees C. or more. The bearings must typically operate below 200 degrees C. to avoid damaging the oil and reducing the hardness and load capacity of the steel bearing races. Microturbines sometimes cantilever the turbine and compressor rotors from a pair of bearings located upstream from the compressor inlet (see, e.g., to the right of the compressor rotor in FIG. 2). This keeps them cool, but the cantilevered rotor then does not have room for an alternator on the same shaft. If the rotor assembly is made longer to make room, shaft dynamics problems can result. The engine in FIG. 1 employs air bearings, a good solution that does eliminate the need for oil, a big advantage. However, air bearings have some disadvantages as well, including air foil touchdown during start/stop operation, the need to be kept very clean due to tight clearances, complex rotordynamics, relatively high cost, and the need for considerable testing and development work to ensure high reliability.

Accordingly, there remains a need in the art for a simple, compact, lightweight, efficient recuperated gas turbine engine configuration that reduces gas leakage and hot section heat losses, improves compressor efficiency by reducing heat transfer to the compressor rotor and diffuser, and minimizes axial bearing loads by opposing the turbine and compressor axial thrust directions.

SUMMARY OF THE INVENTION

According to one aspect of the invention, an engine is described that includes a compressor, a turbine, a heat exchanger, and a combustor. The compressor is mounted on a rotating shaft with at least one rotor with an inlet and an outlet, and at least one diffuser downstream from each rotor. The turbine includes at least one stator, and at least one rotor with an inlet and outlet located downstream of each stator, and mounted on the rotating shaft as the at least one of the compressor rotors. The inlet of the compressor rotor faces toward the outlet of the turbine rotor. The heat exchanger is configured to preheat the compressed air leaving the compressor by transferring heat from the turbine exhaust. The combustor can be configured for mixing fuel with the compressed air, either upstream or downstream from the heat exchanger, and further configured for igniting the preheated fuel/air mixture located downstream from the heat exchanger.

According to another aspect of the invention, an engine is described that includes a compressor, a turbine, a heat exchanger, and a combustor. The compressor includes at least one rotor with an inlet and an outlet, mounted on a rotating shaft. The turbine includes at least one stator, and at least one rotor with an inlet and outlet located downstream of each stator, mounted on the rotating shaft as at least one of the compressor rotors, and wherein the inlet of the compressor rotor faces toward the outlet of the turbine rotor. The heat exchanger can be configured to preheat compressed air leaving the compressor by transferring heat from the turbine exhaust. The combustor can be configured for mixing fuel with the preheated compressed air from the heat exchanger, and further configured for igniting the preheated fuel/compressed air mixture located downstream from the heat exchanger.

According to another aspect of the invention, an engine is described that includes a compressor, a turbine, a first heat exchanger, and a second heat exchanger. The compressor includes at least one rotor with an inlet and an outlet, mounted on a rotating shaft. The turbine includes at least one stator, and at least one rotor with an inlet and outlet located downstream of each stator, mounted on the rotating shaft as at least one of the compressor rotors, and the inlet of the compressor rotor faces toward the outlet of the turbine rotor. The first heat exchanger can be configured to preheat compressed gases leaving the compressor by transferring heat from an exhaust of the turbine exhaust. The second heat exchanger can be configured for transferring additional heat to the preheated compressed gas leaving the first heat exchanger from an external source.

These and other aspects, objects, and features of the present invention will become apparent from the following detailed description of the exemplary embodiments, read in conjunction with, and reference to, the accompanying drawings.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which:

FIG. 9 shows a cross-section view, front view, and a 3D exploded view of a compressor rotor and diffuser, in accordance with an exemplary embodiment of the invention.

DETAILED DESCRIPTION OF EXEMPLARY EMBODIMENTS

Figure 1:
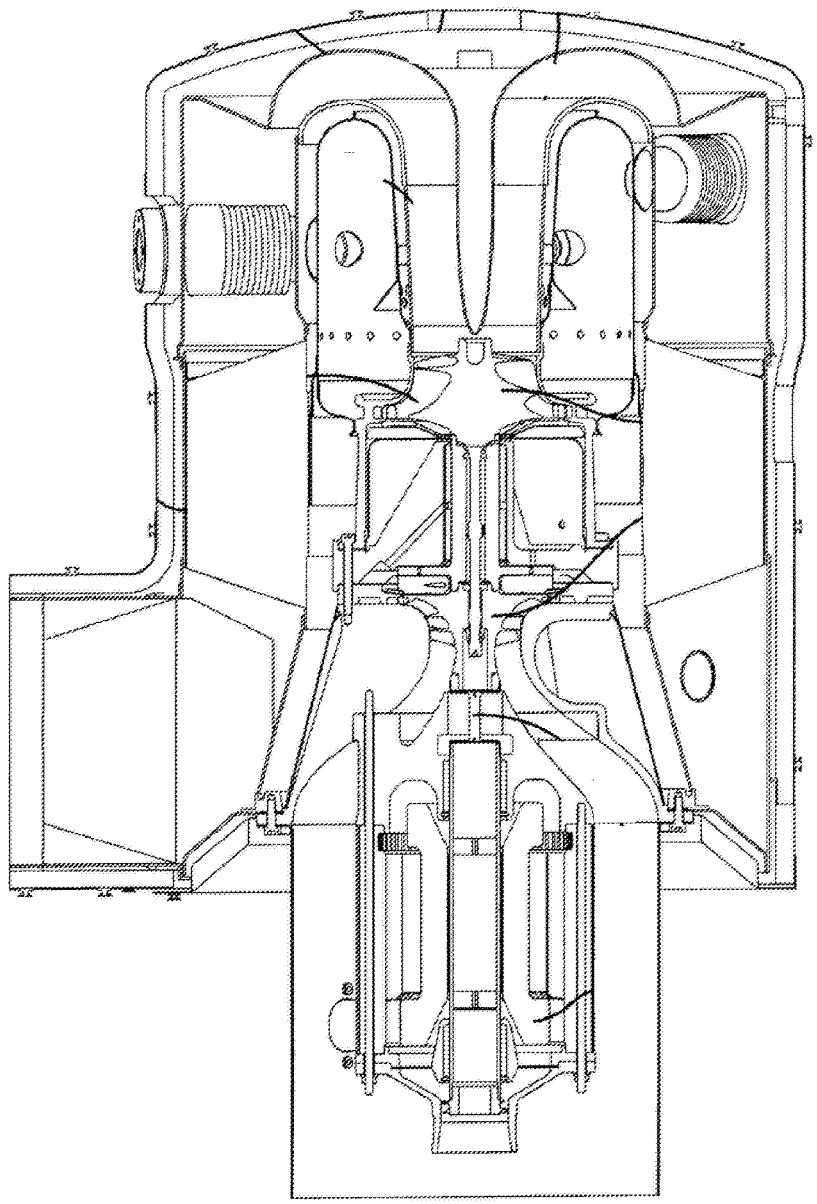
FIG. 1 is a prior art diagram of a conventional recuperated microturbine.

One or more embodiments or implementations are hereinafter described in conjunction with the drawings, where like reference numerals refer to like elements throughout, and where the various features are not necessarily drawn to scale.

Figure 3:
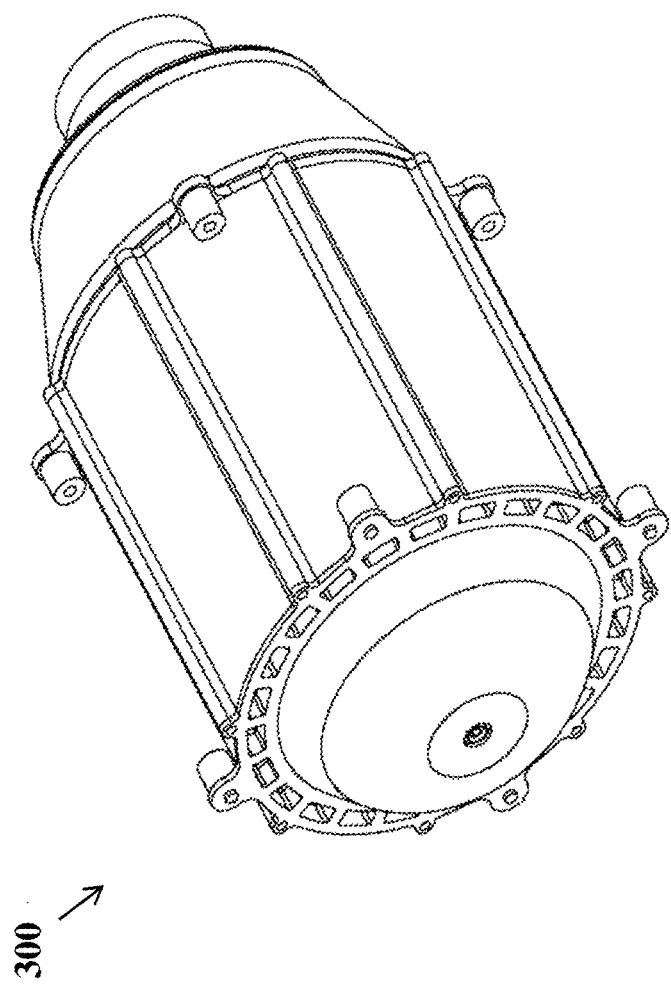
FIG. 3 is a recuperated gas turbine engine, in accordance with an exemplary embodiment of the invention.
Figure 4:
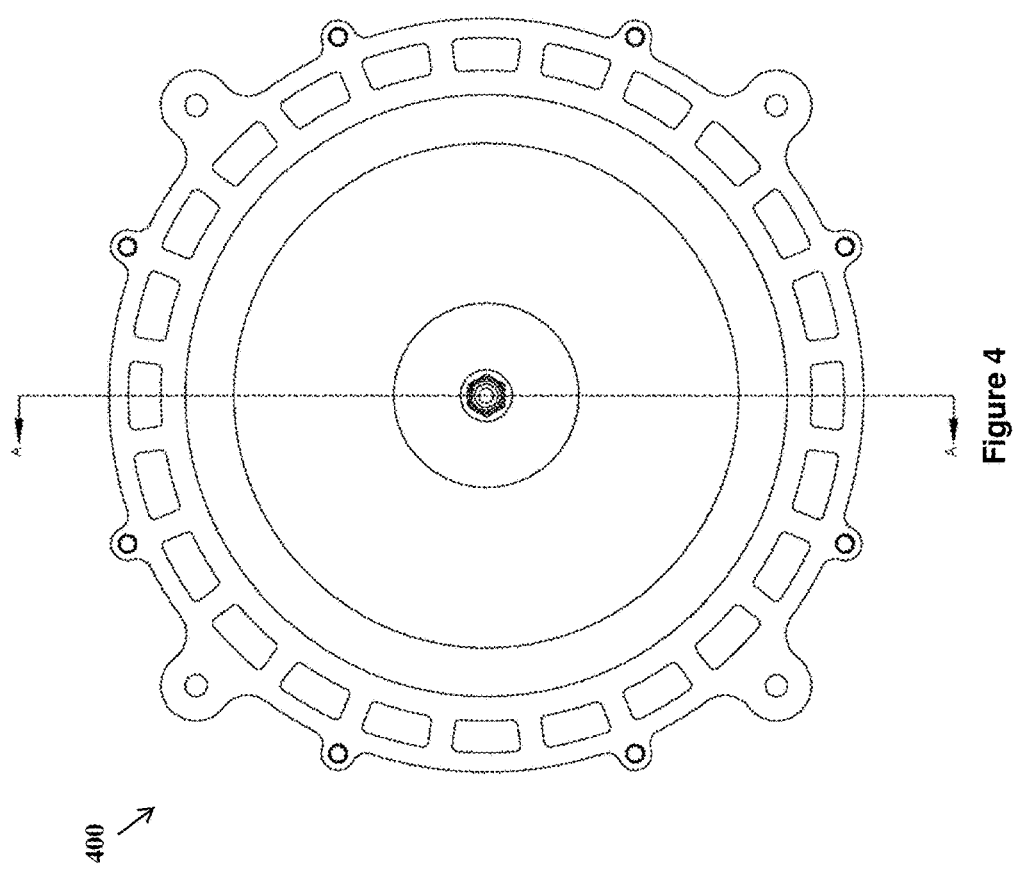
FIG. 4 is a view of a recuperated gas turbine engine as seen from the exhaust outlet end, in accordance with an exemplary embodiment of the invention.
Figure 5:
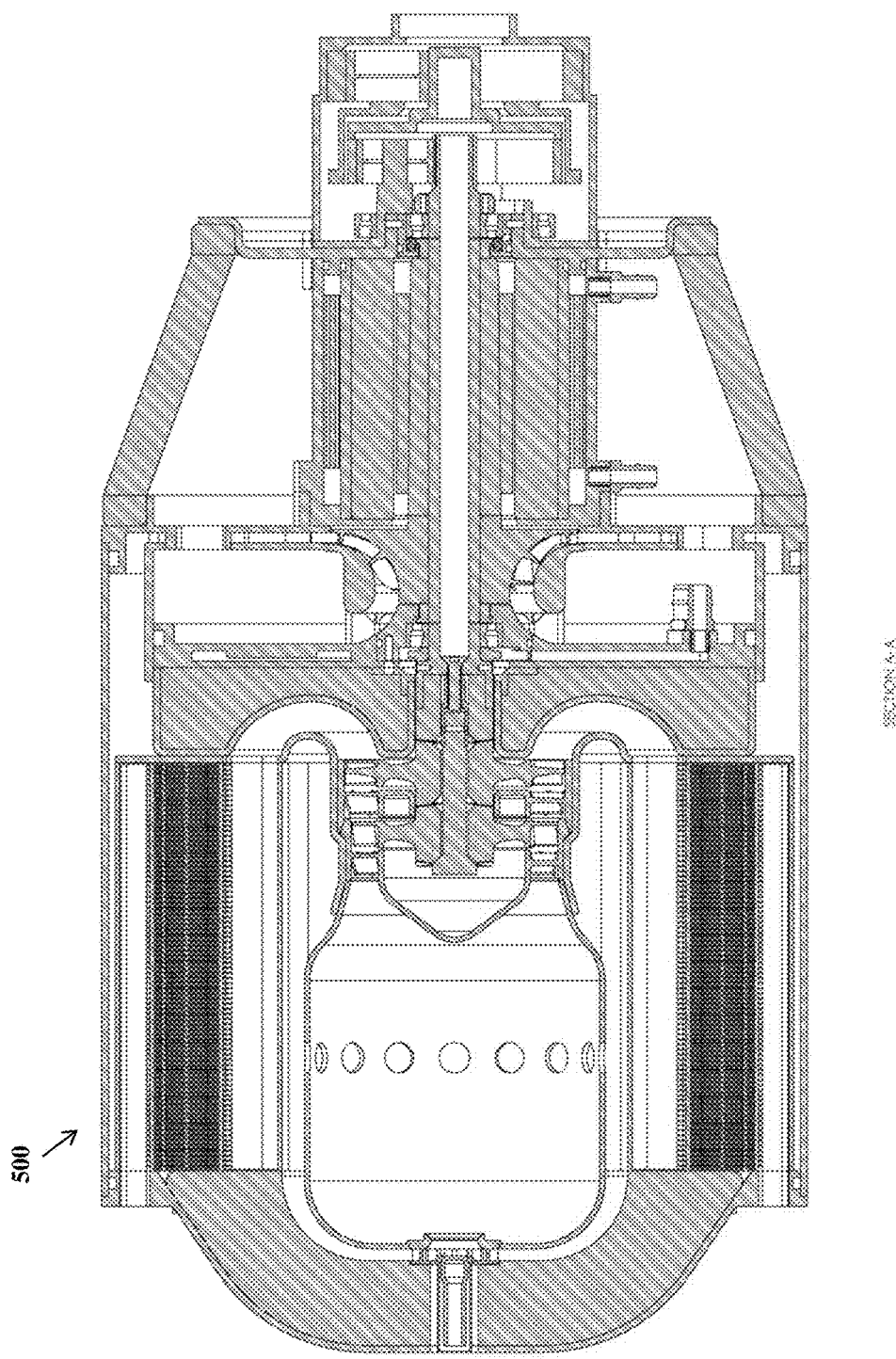
FIG. 5 is a cross-section view of a recuperated gas turbine engine, in accordance with an exemplary embodiment of the invention.

In general, FIGS. 3, 4, and 5 show exemplary embodiments of the invention. Specifically, FIG. 3 is a recuperated gas turbine engine 300, in accordance with an exemplary embodiment of the invention. FIG. 4 is a view of a recuperated gas turbine engine as seen from the exhaust outlet end 400, in accordance with an exemplary embodiment of the invention. FIG. 5 is a cross-section view of a recuperated gas turbine engine 500, in accordance with an exemplary embodiment of the invention.

Figure 6:
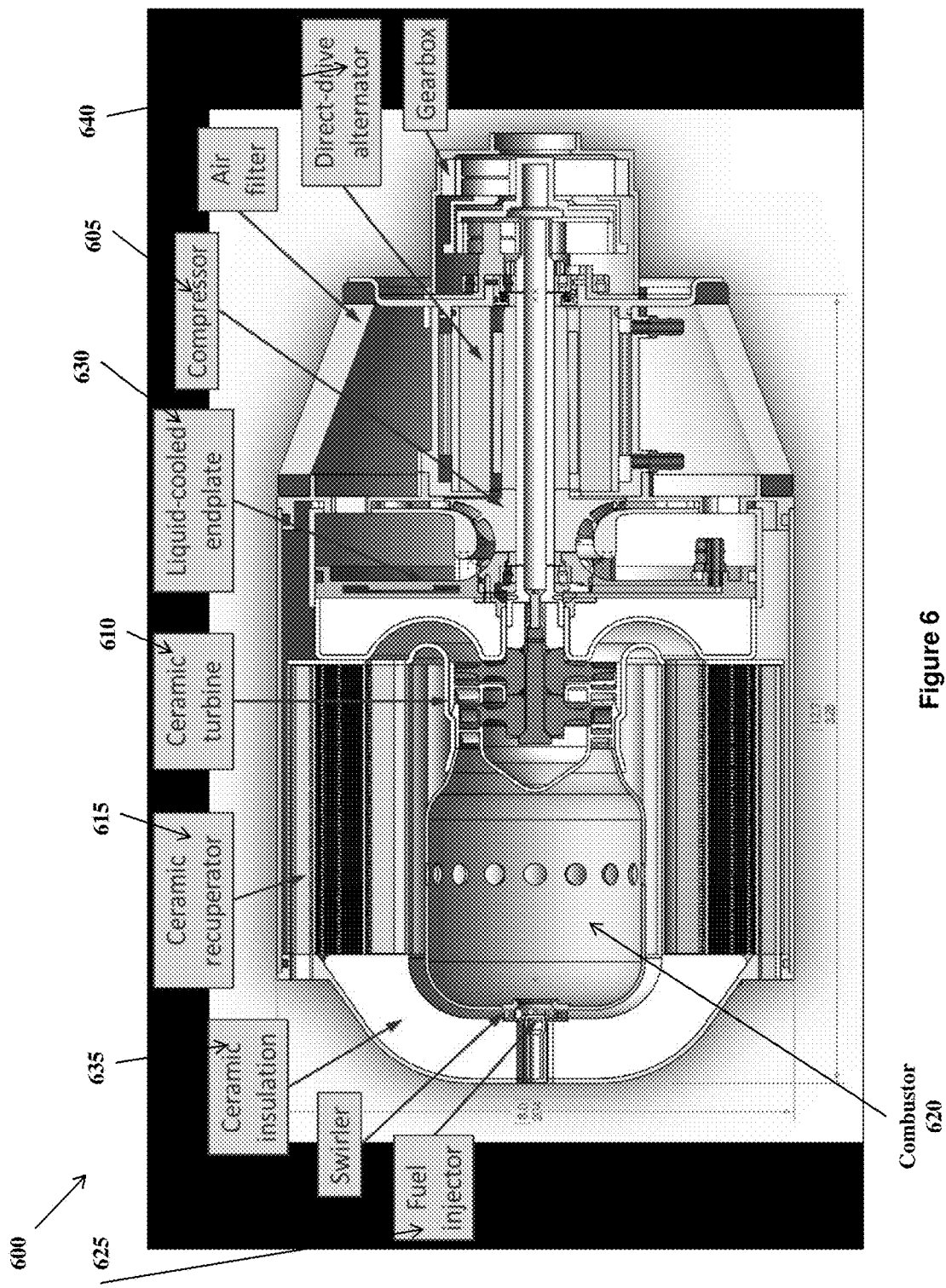
FIG. 6 is an alternative cross-section view of a recuperated gas turbine engine, in accordance with an exemplary embodiment of the invention.

FIG. 6 is an alternative cross-section view of a recuperated gas turbine engine 600, in accordance with an exemplary embodiment of the invention. One of ordinary skill in the art will note that the size of the engine can be varied to exemplify different embodiments. Accordingly, size, power output, and other details can be changed in many ways while still maintaining the key features and advantages.

In general, the gas turbine engine 600 can include a compressor 605 that can include at least one rotor with an inlet and an outlet, mounted on a rotating shaft. The rotor can be configured for accelerating and compressing air. The compressor 605 can also include at least one diffuser downstream from each rotor, and the diffuser can be configured for decelerating the air and converting its kinetic energy to additional static pressure.

The compressor 605 can be a single stage radial or mixed flow compressor, wherein at least a portion of the compressor 605 diffuser can be configured to create discrete diffusion passages with spaces between them through which the compressor rotor inlet air flows, enabling the uncompressed inlet air to cross over the compressed air diffusion passages to reach the compressor rotor inlet. The portion of the diffuser with discrete passages can be a volute diffuser, a pipe diffuser, or a wedge diffuser with hollow wedges. More specifically, the diffuser portion can be a wedge diffuser with hollow wedges, and can be formed by nesting, mating, and permanently joining by sliding together in the axial direction, two halves that are generally concentric and approximately planar in the radial direction, with wedge walls and interior holes extending in the axial direction. In addition, the wedge diffuser halves can be made from aluminum and joined together by brazing or welding, or made from a fiber-reinforced polymer composite material and joined together by bonding with a high-temperature adhesive.

The gas turbine engine 600 can also include a turbine 610 that can include at least one stator configured to expand and accelerate heated, compressed air and combustion products in a swirling motion. In addition, the turbine 610 can include at least one rotor with an inlet and outlet located downstream of each stator, mounted on the same rotating shaft as at least one of the compressor rotors, and configured to convert the kinetic energy of the swirling air and combustion products to useful shaft work. In this particular exemplary embodiment, there is a two stage axial flow turbine, comprising, from left to right, a first stator, a first rotor, a second stator, a second rotor, and an annular duct that provides a path for the exhaust from the second turbine rotor to flow to the recuperator.

The rotating shaft assembly can include a thermally insulating coupling feature located between the compressor 605 and turbine 610 portions of the rotating shaft assembly. The thermally insulating coupling feature can include a rotating thermal insulator rigidly attached to the compressor portion, with geometric surfaces on the thermal insulator and mating geometric surfaces on the closest adjacent turbine rotor, wherein the geometric surfaces can be configured to allow radial sliding, relative centering, and torque transmission; and further be configured with means to maintain an axial force between the turbine portion of the shaft assembly and the compressor portion of the shaft assembly, such as the central tie bolt that is shown concentric with the turbine rotors.

The gas turbine engine 600 can include a heat exchanger, or recuperator, 615 that can be configured to preheat the compressed air leaving the compressor 605 by transferring heat from the turbine 610 exhaust. The heat exchanger can be generally annular (i.e., ring-shaped or circular) in construction, with compressed air flowing generally radially inward, and turbine exhaust flowing generally radially outward.

The gas turbine engine 600 can also include a combustor 620, which can be configured for mixing fuel with the compressed air, either upstream or downstream from the heat exchanger 615, and further configured for igniting the preheated fuel/air mixture in a location downstream from the heat exchanger 615. In general the combustor 620 can be a can type combustor. More specifically, the combustor 620 can include a generally cylindrical and hollow 'can' shape, with a single fuel injector located at one axial end of the can. The combustor can be configured for mixing the injected fuel with at least a portion of the compressed air, near or concentric with the fuel injector at the same axial end of the can; and one outlet for the heated air and combustion products, located at the opposite axial end of the can, and connected directly to the first turbine stator inlet.

The heat exchanger 615 and the combustor 620 can be enclosed inside a pressure vessel, and the portion of the combustor 620 disposed to ignite and sustain combustion in the fuel/air mixture can be located generally concentric with the heat exchanger 615.

In an exemplary embodiment of the invention, the inlet of the compressor 605 rotor can face toward the outlet of the turbine 610 rotor. That is, the compressor 605 rotor inlet can be axially closer to the turbine 610 than the compressor 605 rotor outlet, and the turbine 610 rotor outlet can be axially closer to the compressor 605 than the turbine 610 rotor inlet.

In the exemplary embodiment 600 of the invention, the recuperated gas turbine engine can include a generator feature that includes a rotor mounted on the rotating shaft assembly, and a stator mounted concentric with the generator rotor. The generator feature can be configured to convert the net shaft power produced by the gas turbine engine 600 to electric power.

In an alternative exemplary embodiment of the invention, not represented in the figures, the recuperated gas turbine engine can omit the generator. In its place, all that is required is some other means of delivering the output shaft power of the engine to some other machine or component that would employ the shaft power for some useful purpose. These means could be, for example, a simple shaft with a mechanical coupling such as a splined shaft or flex coupling, designed to connect to a high-speed driven component; an output gear, designed to provide input shaft power to a gearbox of some kind; a smooth drive roller for a traction drive instead of a toothed gear for a gearbox; a drive pulley for a belt drive system; a complete gearbox, traction drive, belt drive, or other mechanical transmission assembly; a hydraulic pump to convert the shaft power to useful fluid pressure and flow; a propeller or fan designed to accelerate air and produce thrust; or any other means for delivering the power from the gas turbine engine 600 to another machine component for some useful purpose.

Figure 7:
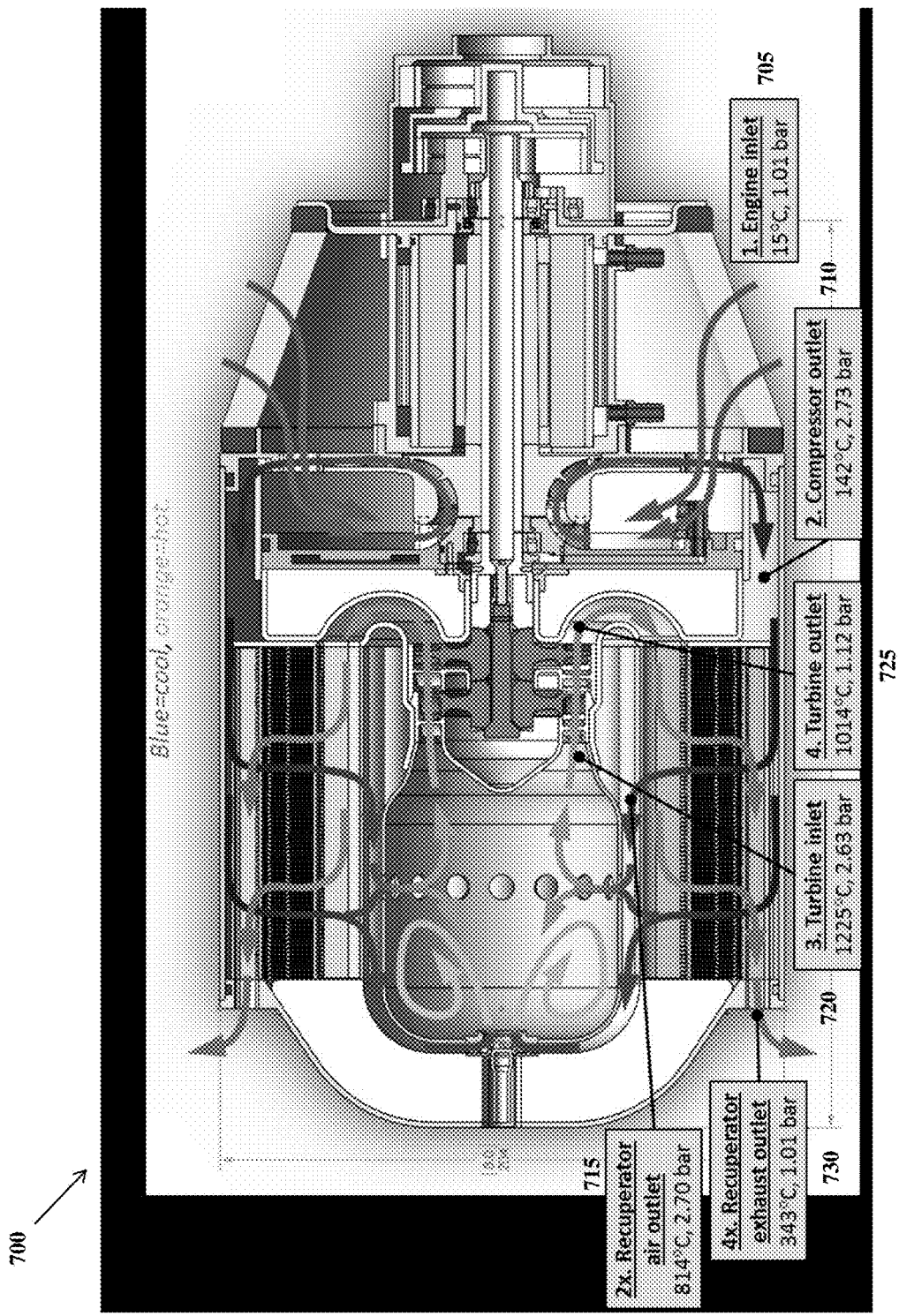
FIG. 7 is a diagram representing the air flow path in a recuperated gas turbine engine, in accordance with an exemplary embodiment of the invention.

FIG. 7 is a diagram representing the air flow path in a recuperated gas turbine engine, in accordance with an exemplary embodiment of the invention. Specifically, in an exemplary embodiment of the invention, FIG. 7 specifies gas temperatures and pressures at various points in the flow path. These temperatures and pressures are provided herein only as an example. One of ordinary skill in the art will understand the invention could be practiced with a different overall pressure ratio, turbine inlet temperature, recuperator effectiveness, etc. These and various other cycle parameters could be varied throughout a wide range in an engine that still matches the claims and shares the key features and advantages of this invention.

Figure 2:
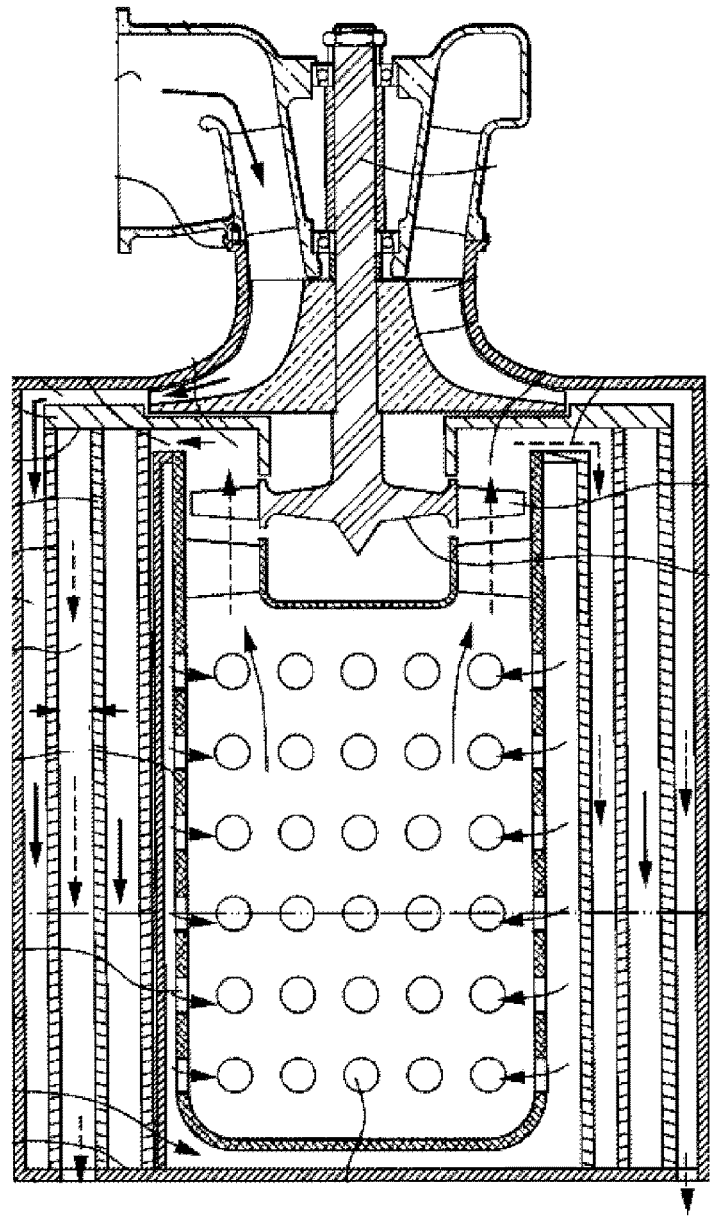
FIG. 2 is a prior art diagram of a gas turbine engine with a reversed turbine.

In this exemplary embodiment of the invention, air can be drawn from the atmosphere at state 1, Engine Inlet (705). The atmospheric air can be transported through an air filter, which can be a cotton or paper barrier filter. Next, the air can traverse through the plane of the compressor diffuser, through holes more clearly visible in FIG. 9. One of ordinary skill in the art will understand that the compressor diffuser does not need to be of this design. Instead, it can be a pipe diffuser, a scroll diffuser, or some other diffuser design. However, the key feature is that the compressor diffuser must not be a solid disc, like the prior art diffusers shown in FIG. 1 and FIG. 2 (typical of many turbine engines with centrifugal compressors). Instead, the compressor diffuser must have some sort of holes or space between compressed/diffusing air flow passages, to enable the inlet air to reach the compressor inlet.

The air then flows into the compressor inlet, and can be ingested into the rotor blade passages and slung radially outward. It then flows through the diffuser passages mentioned above, and reaches the outer periphery of the housing. In the compressor inlet area, there can be provided a fuel injector (not shown in the Figures) for mixing fuel and air, upstream from the compressor rotor. The fuel injector can inject a spray of liquid fuel droplets, or a heated/evaporated stream of previously liquid fuel, or a fuel that is gaseous at room temperature like natural gas, propane, hydrogen, etc. It may be advantageous to turn off this fuel injector when starting the engine, and then turn it on once the recuperator is warm. At that point, the fuel injector 625, shown at the left of FIG. 6 on the engine centerline, could be turned off, or the flow rate there could be reduced until it just barely keeps the flame lit.

When the air leaves the diffuser passages and enters the outer housing, labeled state 2, compressor outlet (710), the air is still relatively cool, but is at well above atmospheric pressure. The outer housing is a pressure vessel that creates a gas pressure external to the recuperator that loads the recuperator walls primarily in compression, which tends to make cracks and leaks close up rather than open further, and makes use of the great strength of ceramic materials in compression, if the recuperator is ceramic. The housing can have air cooling fins or other features to keep it cool, but may or may not need any, if the compressor discharge air temperature is lower than the maximum service temperature of the materials from which the housing is made. For example, if the housing were made from aluminum, it would be expected to perform well at the temperature shown in the figure.

The circumferential grooves shown in the end plates of the housing, located at each end of the outer canister, are O-ring grooves. The O-rings can be made from elastomers that can perform well at temperatures in the neighborhood of the compressor discharge temperature, such as silicone, fluorosilicone, Kalrez, PTFE, Viton, FEP, etc. Alternatively, the housing may be cooled with air cooling fins locally; or, the housing end plate may be liquid cooled; or, the housing may not require O-rings at all, if for example it is joined with the endplates, or some other gas sealing method is used. The housing may be separable along an axial plane (through the engine centerline) rather than along a radial plane (perpendicular to the engine centerline); this might be called a "clamshell" housing design. The important features are the pressure vessel, sealing method, means to disassemble and reassemble the engine, and compatibility with temperatures in the range of the compressor discharge air temperature.

Again, at state 2 (710), a fuel injector can be provided to premix fuel and air. This could inject liquid, boiled/evaporated liquid, or compressed gaseous fuel. In an alternative embodiment, fuel can even be injected somewhere between state 1 (705) and 2 (710), for example inside the compressor diffuser passages where the velocity is high and mixing is likely to be quite good.

Whether fuel is injected at the compressor inlet, inside, or after the compressor 605, it may be advantageous to set the air/fuel ratio below the flammability limits for fuel/air mixtures at the compressor outlet temperature and pressure. This way, even if a spark were lit in the mixture, it could not burn.

From state 2 (710), the air can flow axially to surround the outer periphery of the recuperator 615 as shown, enters the recuperator 615 through radial slots, flows through the recuperator core, and ends up at state 2x (715), the recuperator air outlet. The recuperator air outlet is the entire plenum at the center of the recuperator 615, outside the combustor liner 620. (The combustor liner 620 is the cylindrical object with a ring of holes, labeled 620 in FIG. 6, but not labeled in FIG. 7). The air then can penetrate the combustor liner through various holes that are arranged to mix the air and fuel, stabilize burning, cool the liner, and perform all other typical combustor liner functions well known to those skilled in the art.

Burned gases can flow from the combustor can 620 toward the right of the figure to state 3 (720), the turbine inlet. The turbine 610 can be axial or radial flow; can have one, two, or more stages; and can be a single-shaft or multiple-shaft design. The turbine 610 can be metal or ceramic, and the stages, if more than one, may be joined together, and attached to the combustor liner, exhaust duct, housing end wall, etc. by any of a number of methods. An axial flow multistage turbine can be particularly advantageous due to its compactness, short axial length, low hub mass (helpful for shaft dynamics reasons), and high overall work coefficient (sum of stage work coefficients).

At the turbine outlet, state 4 (725), the gas temperature is typically lower than at the inlet, and the pressure is just above atmospheric. This means its density will be quite low, compared with atmospheric air. From state 4 (725), the turbine exhaust flows through a predominantly radial duct, into the recuperator manifold tubes, and radially outward through the core, cooling off substantially as it does so, and transferring heat to the incoming fresh air in the alternating recuperator channels.

The gas can be collected in manifold tubes and flows out of the engine in the axial direction to state 4x (730), the engine exhaust. At that point, there could be a ring-shaped exhaust collection manifold that ducts the exhaust to one or more tubular outlets or pipes, not shown in the picture. In many cases this might be unnecessary.

A liquid-cooled endplate 630 can be cooled by water or, perhaps preferably, by engine oil. The purpose is to provide a heat sink for some heat that will inevitably be conducted from the hot section (turbine 610, exhaust duct, recuperator end face) to the compressor 605.

Liquid cooling may not be mandatory. Air cooling may be acceptable if for example a large number of fins were machined into the face of the plate, to transfer heat to the engine intake air, or preferably to the rim of the plate, to transfer heat to the compressor discharge air. (Any heat transferred to the compressor intake air is even more harmful to the compressor efficiency than heat transferred to the diffuser, so although fins on the face of the plate might be effective in keeping it cool, that fin location would be detrimental to the engine efficiency.)

Certain components along the flow path from the hot section to the compressor may be made from thermally insulating materials. For example, in FIG. 6 there are two generally round, white blocks, one on each end of the recuperator. The one on the left is labeled "ceramic insulation" 635, and the one on the right, which is in contact with the liquid-cooled plate 630, is unlabeled. That too may be porous ceramic insulation. These two round pieces can be made from the same material or different materials, since temperatures in those respective locations might be slightly different. Appropriate materials might be Zircar SALI or SALI-2 or AXHTM, or other high-temperature, low density materials that can tolerate high temperatures and have very low thermal conductivity. In choosing among such materials it may be determined that the highest-temperature-capable ceramic insulation is not as good as other options in some ways; for example, some may have lower maximum temperature capability but lower thermal conductivity, lighter weight, lower cost, greater strength, or some other desirable feature. Since temperatures on the right side are generally lower (because the turbine outlet is cooler than the turbine inlet), it may be advantageous for the insulation disc on the right, contacting the liquid cooled plate 630, to be made of a lower temperature insulation that offers better performance in one of these other respects.

The main engine shaft can be hollow. Oil can be injected into the hollow space. This can serve to cool the shaft, providing a heat sink for heat conducted through the shaft, and through the ceramic insulator if one is used, between the turbine 610 and the compressor 605 inlet bearing. It can also lubricate both bearings via small drillings in the shaft, which are shown in the figures, one next to each bearing. This oil can be removed from the bearing housings using scavenge pumps or other methods well known to those skilled in the art. Alternatively, the bearing lubricating oil could be supplied via tubes and channels in the bearing housing rather than through the rotating shaft. Still another alternative would be to replace the rolling-element, oil-lubricated bearings with air bearings, magnetic bearings, oil journal bearings, or another of the wide variety of bearing systems known to those skilled in the art.

Figure 8:
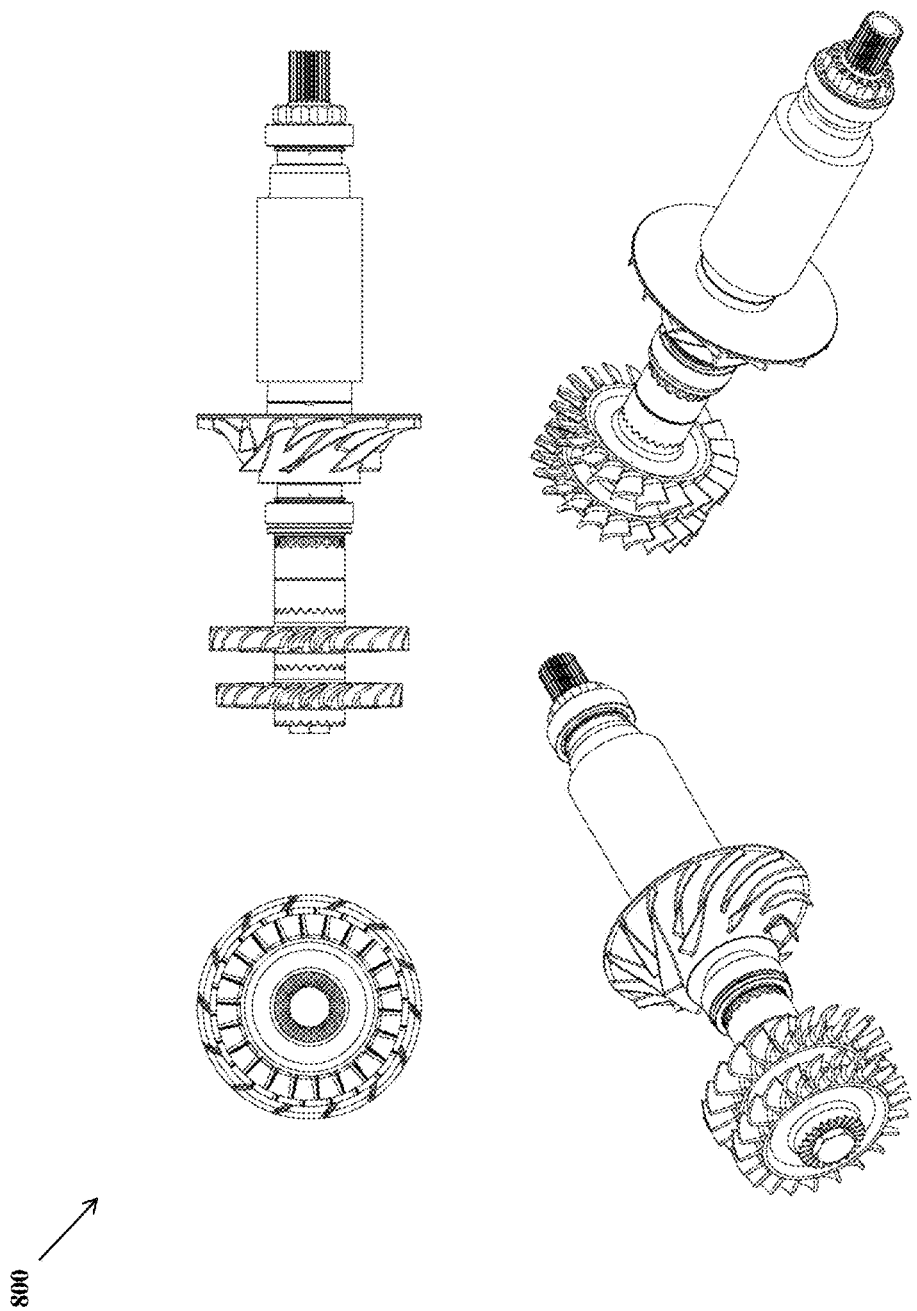
FIG. 8 shows a front view, side view, and a 3D view of a rotating assembly, in accordance with an exemplary embodiment of the invention.

As described herein with respect to the air flow in FIG. 7, FIG. 8 shows front, side, and 3D views of a rotating assembly, in accordance with an exemplary embodiment of the invention. From left to right in the right-side view (upper right of this figure) is the two-stage axial turbine, insulating shaft coupling, hot end ball bearing, single stage centrifugal compressor, alternator rotor, cool end ball bearing, retaining nut, and output gear.

FIG. 9 provides several views (cross-section, front view, 3D exploded view) of a compressor rotor and diffuser, in accordance with an exemplary embodiment of the invention. One of ordinary skill in the art will understand that this diffuser is only one of several designs that would be compatible with this engine layout in accordance with an exemplary embodiment of the invention. It has a radial vaneless space, followed by hollow vanes through which uncompressed intake air can pass, on its way to the compressor rotor inlet. Alternatively, a pipe diffuser would also have spaces between the diffuser passages that provide a path for intake air to reach the compressor inlet.

Overall, an exemplary embodiment of the invention offers various improvements over current state of the art recuperated gas turbine engine designs, particularly those that are small; use ceramic materials; and are designed to be compact, lightweight, and highly reliable, such as those used for aircraft propulsion or land-based portable electric power generation.

First, the axial thrust on the bearings is better balanced. Based on thrust estimates from the exemplary embodiment, and given the fact that bearing life is proportional to the third power of the load, all else being equal, the bearing life can be more than 40 times greater, which is clearly a significant advantage. To further reduce axial load, certain parameters in the engine shown in the cross section views above can be adjusted. For example, the degree of reaction of the axial turbine can be modified to reduce or increase its thrust, as needed, to balance the compressor thrust. The compressor backsweep, the degree of diffusion in the rotor blade passages, the hub and shroud diameters at the inlet, and the seal diameter near the cool-end bearing are some of the many design parameters that could be adjusted to achieve better thrust balance. By working with these parameters, an engine designer could, in principle, achieve near-perfect thrust balance on the rotor assembly, at least for the target operating points (speed/power/temperature) of the engine, and perhaps even for most or all operating points, including startup or part-power operation. Designing for very good axial thrust balance at one or more of these target operating points could result in potentially extraordinarily long bearing life, while contributing to potentially extremely high overall engine reliability and exceptionally low operating cost per hour.

Some gas turbine engines employ "balance pistons" because they do not or cannot arrange the turbomachinery to achieve such good axial thrust balance. A balance piston may have a seal near its outer periphery and different gases on each side of the seal. While this device can bring thrust values into better balance, it is not ideal for several reasons. First, a balance piston occupies space along the shaft, potentially making it longer, and it adds weight. Both can create shaft dynamics (i.e., whirl) problems. Second, a balance piston inherently requires a gas seal at its rim, and this means there will be gas leakage from the high to the low pressure side. As stated previously, gas leakage is a big problem for efficiency, especially in small engines. Third, viscous drag/skin friction on the disc and cylindrical faces of the balance piston is another energy loss term that can be substantial. For all these reasons it is preferable not to use a balance piston if this can be avoided, especially in small gas turbine engines.

Second, as mentioned above, the gas pressure at the turbine outlet is typically much lower than at the turbine inlet. At the outlet, the pressure is typically just above atmospheric (perhaps 1.03-1.15 atm absolute pressure, or 0.03-0.15 atm gage pressure, for typical recuperated engine designs). This means its density will be quite low, compared with atmospheric air, and especially low compared to cool compressor discharge air or high-pressure hot turbine inlet gases, which are the conditions on each end of typical microturbine shaft such as the prior art engine design of FIG. 1. Since the pressure at the compressor inlet is also typically very close to atmospheric, this almost guarantees that in the present invention, the pressures along the shaft seal will be well balanced. As explained above, this is important because the shaft is spinning extremely fast and is hot, so using a contacting seal to prevent gas leakage through this area is unlikely to be a practical solution. A non-contact labyrinth seal will inevitably allow some air through, and this will reduce the engine efficiency, but in the present invention, with such a low pressure difference driving flow through this area, and low density gases on both sides, the leakage flow rate along the shaft for this engine configuration will be greatly reduced.

Third, it should be noted that the air flow passages of the compressor diffuser do not contact the part of the housing that is in physical contact with the hot section (turbine, combustor, etc.) Thus, there is a long path that heat must traverse to go from the combustor/turbine/recuperator/exhaust duct to the compressor diffuser. This long path imposes a big thermal resistance to heat flow, which greatly reduces heat transfer to the diffuser, so that it operates nearly adiabatically. As explained above, this can improve the compressor efficiency in a small engine. The difference can be as much as 10%, relative to the efficiency of a compressor like those pictured in prior art FIG. 1 and FIG. 2, and those used in most prior art microturbines, which have diffusers that are subject to a higher degree of undesirable heating due to their closer proximity to the engine's hot components.

Fourth, the position of the compressor diffuser makes room for thermally insulating materials to be placed between the compressor and hot section. Furthermore, the fact that the turbine outlet points toward the compressor is also advantageous, because the turbine outlet is cooler than the turbine inlet, and this reduces heat transfer to the compressor simply by creating a smaller temperature difference across the insulation between the turbine and compressor. This also allow a larger volume of lower-temperature but higher-performance (lower thermal conductivity) insulation to be used in that area, further reducing heat transfer across the insulation.

Fifth, if the actively-cooled endplate 630 is used, this helps augment the fourth advantage, providing a heat sink for the heat transfer coming from the hot section. Even though the heat transfer rate may be lower in this engine configuration, some still gets through. It has to go somewhere. The heat sink provides a temperature-controlled way to get rid of it, keeping the compressor inlet bearing cool (improving the bearing and oil life) and minimizing heat transfer to the compressor (improving its efficiency).

Sixth, extra cooling channels, flow, and surface area can be provided near the bearing housing to manage temperatures there. Bearing thermal management, which involves precise control of the inner and outer race temperatures, can be accomplished by controlling the oil flow rate through the shaft vs. the coolant flow rate near the bearing housings. This is another way to further improve the bearing life.

Seventh, the barrier air filter provides important advantages because it removes particulate material from the air, which could otherwise cause problems. For example, sand or dust in the air can damage bearings, erode the turbomachinery blades, foul (clog up) the tiny air passages inside the recuperator, or melt and deposit a glassy coating on the hot section components. Recuperator fouling was a major life-limiting problem for the M1 Abrams tank engine. CMAS (calcium magnesium aluminum silicate) deposits have been a problem even in non-recuperated engines operated in desert environments because they can change the aerodynamics, because blade tips to rub, change the effective orifice diameters, and flake or spall off hot section components in sizeable chunks, impact the blades, and cause significant damage. Thus, a barrier filter can provide major benefits in a number of areas. Its disadvantage is that it increases the engine weight by almost 10% and creates slight pressure losses. For those reasons a barrier filter is not often used in simple cycle (un-recuperated) engines, but in a recuperated engine it is well worth the weight.

Eighth, in FIG. 6, a starter/alternator 640 is provided. The starter/alternator 640 can act as a motor to power the shaft up to a certain speed to start the engine, and when the engine is producing net power, it can shift to alternator mode, generating electric power upon demand. If a load is attached to the alternator and current flows through it, gearbox power will be reduced; if not, full shaft power can be available at the output sun gear. This is well known to those skilled in the art. The advantage of the present invention is that the alternator 640, turbine 610, and compressor 605 are all on one shaft, with bearings on each end of the compressor/alternator assembly. The wide spacing between these bearings can help reduce gyroscopic loads and improve bearing stiffness. It is the a) compact arrangement of turbomachinery, b) the provisions given to cool the shaft and the housing endplate, c) the thickness and stiffness of the shaft near the compressor inlet bearing, and d) the concentration of mass near the center of the rotating assembly between the two bearings, which, together, can make it possible for the shaft assembly to incorporate a sizeable alternator, without increasing its length so far as to create shaft dynamics (whirl) problems.

Ninth, this engine configuration is readily compatible with a "heat recirculating combustor" concept. Again, along with the first fuel injector 625 at the left of the cross-section figures, a second fuel injector (not shown in the images) could be placed somewhere upstream from the recuperator 615, for example somewhere near or in the compressor inlet bellmouth, or inside the diffuser passages, or in the compressor outlet gas stream near position 2, or even between one or more pairs of recuperator wedges to deliberately create a locally richer mixture. A mixing chamber could be provided near position 2 to ensure a homogeneous fuel/air mixture. If fuel is injected upstream from the compressor or inside the diffuser passages, high velocities and shear rates should help the two streams mix very well. Homogeneous mixtures tend to burn cleanly and produce no (or at least less) soot/particulates, which could otherwise foul the recuperator 615, build up on the combustor liner, or flake off and damage the turbine.

If the fuel is gaseous at room temperature—natural gas, propane, or hydrogen, for example—injecting fuel upstream from the compressor 605 could be a huge advantage. A problem with small gas turbines used for gas pipeline compression is the problem with compressing the fuel. To elevate gas fuel pressure up to or above the peak pressure in the engine (so that it will flow into the combustor) requires a very small gas compressor, in a small engine. Small compressors are often quite inefficient, particularly when turbomachinery-type compressors are used. If small engine compressor efficiencies are low, gas fuel compressors will be even lower, for the same reasons, which are exacerbated due to the lower mass flow rate of fuel (air:gas mass flow rate ratios can be on the order of 30-40:1 in conventional turbines, and even greater in recuperated engines). When positive-displacement compressors (screw compressors, piston pumps, etc.) are used, they too are inefficient though perhaps less so; but also, they tend to wear out quickly. All of this can be circumvented by mixing natural gas with air at the engine inlet, if this is done judiciously to avoid premature combustion, recuperator damage, etc., as described in the forthcoming paragraphs.

It may be advantageous to start the engine using only the primary fuel injector 625 on the engine centerline at the left of the figure. Experimentation may alternatively show that both injectors could be used even while starting the engine. In either case, once the engine is started and the recuperator 615 heats up, the flammability limits of the fuel/air mixture widen substantially. With fuel injected upstream from the recuperator 615 and homogeneous, perhaps "flameless," combustion occurring downstream from the recuperator 615, the first fuel injector could possibly be turned off completely. This would confer several significant advantages, such as reducing peak combustion temperatures by eliminating the primary (fuel-rich) zone, the swirling area shown in FIG. 7, indicated by the swirling areas inside the combustor can, which could otherwise melt or damage the combustor can. It should also substantially reduce NOx and perhaps CO emissions by reducing peak combustion temperatures and avoiding the sudden "quenching" (temperature reduction) created by injecting dilution air into the primary zone.

Whether fuel is injected at the compressor inlet, inside, or after the compressor, it may be advantageous to set the air/fuel ratio below the flammability limits for fuel/air mixtures at the compressor outlet temperature and pressure. This way, even if a spark were lit in the mixture, it could not burn. The mixture could only sustain combustion after it flows at least part of the way, and preferably all the way, through the recuperator.

Again, the flammability limits of mixtures widen greatly when the mixture temperature increases, and around about 1200K, they widen very substantially and suddenly. If the engine cycle is designed to produce recuperator air discharge temperatures in the 1000-1200K (727-927 C) range, the mixture would be unlikely to burn while inside the recuperator passages, because either the mixture would be below the lean limit while inside the recuperator, or it may be above the lean limit but any flame could be extinguished by wall quenching effects inside the tiny channels. Furthermore, by being preheated to a temperature just below 1200K, the mixture emerging from the recuperator should be close to flammability, and would not require much additional heat to reach the point where combustion could be sustained.

If the recuperator discharge temperature is above 1200K, this might be even more advantageous, because the mixture would be flammable, and combustion might even self-initiate. Combustion should still be unlikely inside the recuperator channels due to wall quenching effects, and also due to the "ignition delay"—the time required for a combustible mixture to form enough reactive radicals to sustain a reaction. Ignition delay can be on the order of one millisecond, and the residence time of mixture inside the recuperator can be deliberately designed to be less than or equal to the ignition delay.

A final advantage of flameless or premixed combustion is that it might be more stable. If the recuperator discharge temperature is high enough, especially if over 1200K, and given the fact that the engine pictured above provides hot surfaces entirely surrounding the combustor, it seems likely that combustion stability could be extremely good. For an aircraft, which may need to fly at high altitudes where temperatures may be on the order of 217K, "flameouts" are a big problem. If pre-mixing fuel and air, preheating the mixture, and providing hot surfaces surrounding the combustor liner are all very helpful in preventing this, it could reduce engine failures, improve aircraft safety and/or reliability, and confer other related advantages.

In summary, some of the advantages of the heat-recirculating combustor idea might be 1) to protect the combustor liner from excess temperatures by operating it in conventional mode (primary+dilution zones) only when starting the engine; 2) to reduce emissions by avoiding high peak flame temperatures and sudden dilution/quenching; 3) to reduce soot formation which tends to be more likely in non-homogeneous/diffusion-controlled mixing and combustion; and 4) to help improve flame stability.

Tenth, a point already mentioned was that all surfaces surrounding the combustor are hot. Locating the hot side of the recuperator, in particular, adjacent to and surrounding the combustor can reduce heat losses from both the recuperator outlet (which otherwise has to be insulated) and from the combustor liner (which will be exchanging heat via radiation and convection with surfaces that are already close to its own temperature).

Eleventh, it has been pointed out that gas temperatures on both sides of the outer engine housing are not excessive. It may be advantageous to make the outer housing from carbon fiber/epoxy composite material, or some other lightweight but temperature-limited non-metal. This would be lightweight compared to a typical aluminum housing. This is possible due to the presence of the ceramic recuperator with its coolest part facing the exterior.

Twelfth, with both an alternator and a gearbox on the same shaft, and particularly if the alternator can absorb all the engine power, this configuration becomes very flexible. The alternator can be powered as a motor with power fed from fast-discharge batteries such as lithium ion cells. If the gearbox is designed for this much power, the engine assembly can produce double the output power and torque for short periods (net turbine shaft power+motor power). Alternatively, if it is a vehicle power plant and the vehicle needs to slow down, or if it is an aircraft and is descending, the gearbox can power the alternator and recharge the batteries while the engine operates at low power, saving fuel. These and many advantages are common to all hybrid electric vehicles; but, what is not common is the fact that the engine and the alternator are on the same shaft, supported by the same bearings, and are very compact. There are only two bearings needed to support the entire engine assembly, the minimum possible for any rotating machinery. This leads to simplicity, low cost, and low parts count, and should lead to high reliability.

Thirteenth, the single shaft engine configuration allows both turbine inlet temperature and shaft speed to be controlled. The engine can operate at high firing temperature but low-pressure ratio because the alternator can be used to control/influence the shaft speed, while the load may vary. In many engines, only fuel flow rate can be used to control power; shaft speed varies depending on the load and fuel flow rate only, and is not controlled directly. This advantage is shared by all gas turbines engine with a directly coupled motor/alternator, output shaft, and gearbox, but again what is unusual here is the compactness and simplicity of the layout, low bearing count, and high power of the alternator that can be integrated with the high-speed shaft.

Fourteenth, the fact that the turbine thrust points toward the compressor thrust, placing the shaft components between them in compression, is an advantage. This creates additional pressure on the shaft coupling, making it fit tighter rather than looser. In the prior art figure shown in FIG. 1, they are pulling apart from each other, so the turbine tie bolt is being pulled upon, stretching it. It is the only thing keeping the coupling tight. If the gas pressures are large enough, the coupling could become loose, undoubtedly resulting in catastrophic failure. The present arrangement avoids this completely. It should also be noted that if the turbine, and/or coupling were made from ceramic materials, they typically would perform better if loaded in compression than if loaded in tension.

One of ordinary skill in the art will understand that certain components of this invention could be practiced in a number of different ways, without compromising its basic nature, function, novelty, or usefulness. For example, an alternative recuperator 615 can be utilized. Annular recuperators with the core gases flowing radially are not necessarily mandatory, but seem preferable because they make the engine more compact. Annular recuperators with the hot side at the inner portion and the cool side at the outer portion are preferred, because the recuperator can surround the combustor liner and act as a heat insulator or waste heat recovery device for the combustor. In addition, this arrangement fits naturally with the inlets and outlets of upstream and downstream components, making the engine more compact.

The bearings could be arranged differently than the manner shown in the drawings. For example, a back-to-back tandem angular contact ball bearing pair could be used at the compressor inlet, and a single angular contact bearing could be used on the gearbox end, with a preload spring. The preload spring deflection and stiffness could be chosen to add an axial load to the high-speed shaft that balances out the net residual load on the shaft assembly. An angular contact pair supports thrust loads in both directions, so it could be used to keep the shaft from moving, regardless of the net thrust produced. Thus, the compressor bearing (which may be exposed to the most heat) would also be subjected to lower loads for much of the time.

The liquid cooled engine endplate could extend all the way out to the outer engine housing, and an O-ring groove could be machined into this plate to mate with the outer engine housing, rather than making the compressor diffuser hold the O-ring. The liquid cooled endplate could have holes through it to allow compressed air to go through. It could have another O-ring on the right (diffuser) side, and the diffuser could have an outer mating ring. With this arrangement, oil could be supplied and scavenged radially, through fittings in the outer portion of the liquid cooled plate. The outer portion of the liquid cooled plate could also have provisions for the engine mounts. In the current engine, it is the compressor diffuser that has these, on that side of the engine, and there are engine mount provisions on the left (exhaust) side.

Different types of turbomachinery or numbers of stages could be used while still conforming to the primary features of this invention. Its key advantages come from the fact that the turbine outlet faces the compressor inlet. Therefore, a single stage radial-flow or mixed-flow turbine, with its outlet facing the inlet of a single stage centrifugal compressor, would still have reduced leakage, better thrust balance, reduced heat transfer, and other benefits.

As mentioned above, the compressor diffuser could be any type that has passages between which the uncompressed inlet air can flow. For example, a pipe or scroll diffuser could work. It could even be a simple radial vaneless diffuser (no holes) with one or more large radial holes downstream, near the compressor outlet (state 2 (710)) to let the inlet air traverse through radially. The air filter would have to be moved to force air to go through it on its way to the compressor. The only requirement is for there to be some way for air to reach the compressor inlet.

Either the alternator or the gearbox could be omitted. Both could even be omitted, and some other means could be used to harness the shaft power; for example, a direct-drive fan could be added to the shaft, creating a turbofan engine. There only has to be some way to harness the shaft power to do useful work.

The alternator could be supported by its own bearings, while the turbomachinery is supported by its own bearings. The two could be joined with a coupling. This is a common arrangement that can be advantageous even though it is more complex. It makes the engine modular, and makes both shaft assemblies shorter than the single combined unit, for example. Shorter shafts have fewer shaft dynamics problems. The turbomachinery should still be arranged as a single assembly and supported by the same set of bearings, in order to get the load balancing advantage of this invention.

A different combustor layout could be used. The combustor could be omitted entirely, in some cases. For example, if the heat-recirculating burner concept performs adequately and if some method for starting the engine is provided, the combustor liner might not be needed.

The combustor could be omitted in its entirety, and replaced with a heat exchanger that transfers heat from an external source, such as a parabolic mirror that focuses sunlight, a nuclear reactor, a decaying radioisotope, or heat rejected from another process or another engine's thermodynamic cycle, into the preheated compressed air leaving the recuperator.

The engine could be configured as a two-shaft, rather than a single-shaft, engine. For example, the second shaft could have a free power turbine, alternator, and gearbox, and be located on one side of the engine, while the gas generator shaft could have a turbine and compressor, and perhaps a small starter, and be located on the other side. The fuel injector would have to be moved away from the centerline and the combustor would become an annular burner. This eliminates much of the simplicity of the current engine, but if the axial thrusts balance and one turbine outlet faces the compressor inlet, it would still minimize gas leakage along the gas generator shaft. The power turbine shaft would have axial load imbalance and leakage problems that would have to be mitigated some other way, however.

The control system for the engine could be mechanical or electronic; there could be water or fuel cooling for the endplate; other portions of the engine could be liquid cooled as well; the alternator could be air-cooled; the gearbox could consist of spur gear pairs rather than epicyclic/planetary gear trans as shown in the drawings; a different turbine shaft coupling could be used; and various other changes could be made while still adhering to the key features, advantages, and claims of this invention.

In an alternative exemplary embodiment of the invention, a gas turbine engine can include a compressor comprising at least one rotor with an inlet and an outlet, mounted on a rotating shaft; a turbine comprising at least one stator, and at least one rotor with an inlet and outlet located downstream of each stator, mounted on the rotating shaft as at least one of the compressor rotors, and wherein the inlet of the compressor rotor faces toward the outlet of the turbine rotor; a first heat exchanger configured to preheat compressed gases leaving the compressor by transferring heat from an exhaust of the turbine exhaust; and a second heat exchanger configured for transferring additional heat to the preheated compressed gas leaving the first heat exchanger from an external source. A closed-cycle gas turbine engine can include the alternative exemplary gas turbine engine, which can further include a duct connecting the low-pressure exhaust of the heat exchanger to the compressor inlet. also include a duct connecting the low-pressure exhaust of the heat exchanger to the compressor inlet.

It should be understood that the foregoing relates only to illustrative embodiments of the present invention, and that numerous changes may be made therein without departing from the scope and spirit of the invention as defined by the following claims.

The invention claimed is:
1. A gas turbine engine, comprising:
a compressor comprising at least one compressor rotor, the compressor rotor having an inlet and an outlet, being mounted on a rotating shaft, and being configured for accelerating and compressing air, and at least one diffuser downstream from each compressor rotor, the diffuser being configured for decelerating the air and converting kinetic energy of the air to static pressure;
a turbine comprising at least one stator configured to expand and accelerate heated, compressed air and combustion products in a swirling motion into swirling air and combustion products, and at least one turbine rotor with an inlet and outlet located downstream of each stator, mounted on the same rotating shaft as the at least one of the compressor rotors, and configured to convert kinetic energy of the swirling air and combustion products to useful shaft work, wherein the compressor rotor inlet is axially closer to the turbine than the compressor rotor outlet, and the turbine rotor outlet is axially closer to the compressor than the turbine rotor inlet;
a heat exchanger configured to preheat the compressed air leaving the compressor by transferring heat from the turbine exhaust; and
a combustor configured for mixing fuel with the compressed air, either upstream or downstream from the heat exchanger, and further configured for igniting the preheated fuel/air mixture located downstream from the heat exchanger,
wherein at least a portion of the compressor diffuser is configured to create discrete diffusion passages with spaces between them through which the compressor rotor inlet air flows, enabling the uncompressed inlet air to cross over the compressed air diffusion passages to reach the compressor rotor inlet.

2. The engine of claim 1, wherein:
the heat exchanger is annular in construction, with compressed air flowing radially inward, and turbine exhaust flowing radially outward; and
the portion of the combustor configured for igniting the preheated fuel/air mixture is located concentric with the annular heat exchanger.

3. The engine of claim 2, wherein the combustor is a can type combustor.

4. The engine of claim 2, wherein the combustor comprises a cylindrical and hollow can shape, with a single fuel injector located at one axial end of the can; and configured for mixing the injected fuel with at least a portion of the compressed air, near or concentric with the fuel injector at the same axial end of the can; and one outlet for the heated air and combustion products, located at the opposite axial end of the can, and connected directly to the first turbine stator inlet.

5. The engine of claim 1, wherein the heat exchanger and the combustor are enclosed inside a pressure vessel.

6. The engine of claim 1, wherein the combustor is configured for injecting fuel and mixing the fuel with air upstream from the heat exchanger.

7. The engine of claim 1, wherein the rotating shaft comprises a thermally insulating coupling feature located between a compressor portion and a turbine portion of the rotating shaft, wherein the thermally insulating coupling feature comprises:
- a rotating thermal insulator rigidly attached to the compressor portion of the rotating shaft, with geometric surfaces on the thermal insulator and mating geometric surfaces on the closest adjacent turbine rotor, wherein the geometric surfaces are configured to allow radial sliding, relative centering, and torque transmission; and further configured to maintain an axial force between the turbine portion of the rotating shaft and the compressor portion of the rotating shaft.

8. The engine of claim 1, further comprising a generator feature comprising a generator rotor mounted on the rotating shaft, and a generator stator mounted concentric with the generator rotor, the generator feature being configured to convert the net shaft power produced by the gas turbine engine to electric power.

9. The engine of claim 1, wherein the compressor is a single stage radial or mixed flow compressor.

10. The engine of claim 9, wherein the portion of the diffuser with discrete passages is a volute diffuser, a pipe diffuser, or a wedge diffuser with hollow wedges.

11. The engine of claim 10, wherein the diffuser portion is a wedge diffuser with hollow wedges, the diffuser being formed by nesting, mating, and permanently joining by sliding together in the axial direction, two halves that are generally concentric and approximately planar in the radial direction, with wedge walls and interior holes extending in the axial direction.

12. The engine of claim 11, wherein the wedge diffuser halves are made from aluminum and joined together by brazing or welding, or made from a fiber-reinforced polymer composite material and joined together by bonding with a high-temperature adhesive.

13. The engine of claim 1, further comprising a fuel injector located in or upstream from the compressor inlet.

14. The engine of claim 1, further comprising a stationary heat sink located between the turbine and compressor, and configured for rejecting heat transferred from hot components to a liquid coolant.

15. The engine of claim 1, further comprising a stationary heat sink located between the turbine and compressor, and configured for rejecting heat transferred from hot components to the compressor discharge air stream.

16. The engine of claim 1, further comprising a predominantly disc shaped piece of porous ceramic material for thermally insulating hot components from the compressor.

17. The engine of claim 1, further comprising an air filter upstream from the compressor inlet.

* * * * *